United States Patent
Zhu et al.

(10) Patent No.: US 11,683,709 B2
(45) Date of Patent: Jun. 20, 2023

(54) INDICATING A USER EQUIPMENT CAPABILITY FOR CROSSLINK INTERFERENCE MEASUREMENT

(71) Applicant: QUALCOMM Incorporated, San Diego, CA (US)

(72) Inventors: Xipeng Zhu, San Diego, CA (US); Huilin Xu, San Diego, CA (US); Lei Xiao, San Jose, CA (US); Umesh Phuyal, San Diego, CA (US); Omar Mehanna, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,925

(22) Filed: Aug. 24, 2020

(65) Prior Publication Data

US 2021/0067991 A1 Mar. 4, 2021

Related U.S. Application Data

(60) Provisional application No. 62/891,726, filed on Aug. 26, 2019.

(51) Int. Cl.
*H04W 24/10* (2009.01)
*H04B 17/336* (2015.01)
(Continued)

(52) U.S. Cl.
CPC .......... *H04W 24/10* (2013.01); *H04B 7/0626* (2013.01); *H04B 17/318* (2015.01);
(Continued)

(58) Field of Classification Search
CPC ... H04W 56/001; H04W 24/08; H04W 24/10; H04W 8/24; H04B 17/318; H04B 17/336;
(Continued)

(56) References Cited

U.S. PATENT DOCUMENTS

2019/0229781 A1* 7/2019 Jin .................... H04W 72/0446
2021/0006438 A1* 1/2021 Harrebek .............. H04L 5/0051
(Continued)

OTHER PUBLICATIONS

VIVO: "UE-to-UE CLI Measurements", 3GPP Draft, 3GPP TSG RAN WG1 #96, R1-1901690 UE-To-UE CLI Measurements, 3rd Generation Partnership Project (3GPP), Mobile Competence Centre, 650, Route Des Lucioles, Sophia-Antipolis Cedex, France, F-06921 vol. RAN WG1, No. Athens, Greece; Feb. 25, 2019-Mar. 1, 2019, Feb. 15, 2019 (Feb. 15, 2019), XP051599386, pp. 1-4, Retrieved from the Internet: URL: http://www.3gpp.org/ftp/tsg%5Fran/WG1%5FRL1/TSGR1%5F96/Docs/R1%2D1901690%2Ezip, [retrieved on Feb. 15, 2019], paragraph 1, paragraph 2.
(Continued)

*Primary Examiner* — Derrick V Rose
(74) *Attorney, Agent, or Firm* — Harrity & Harrity, LLP

(57) ABSTRACT

Various aspects of the present disclosure generally relate to wireless communication. In some aspects, a user equipment (UE) may transmit a communication that identifies one or more UE capability parameters for at least one of sounding reference signal reference signal received power measurement or cross-link interference (CLI) received signal strength indication measurement. The UE may receive a CLI measurement configuration that is based at least in part on the one or more UE capability parameters. Numerous other aspects are provided.

30 Claims, 7 Drawing Sheets

(51) Int. Cl.
    *H04B 17/318*    (2015.01)
    *H04L 25/02*    (2006.01)
    *H04L 5/00*    (2006.01)
    *H04W 8/24*    (2009.01)
    *H04B 7/06*    (2006.01)
    *H04W 56/00*    (2009.01)

(52) U.S. Cl.
    CPC .......... *H04B 17/336* (2015.01); *H04L 5/0051* (2013.01); *H04L 5/0092* (2013.01); *H04L 25/0226* (2013.01); *H04W 8/24* (2013.01); *H04W 56/001* (2013.01)

(58) Field of Classification Search
    CPC . H04B 17/345; H04B 7/0626; H04L 25/0226; H04L 5/001; H04L 5/0051; H04L 5/0057; H04L 5/0073; H04L 5/0091; H04L 5/0092
    See application file for complete search history.

(56) References Cited

U.S. PATENT DOCUMENTS

| | | | | |
|---|---|---|---|---|
| 2021/0006997 | A1* | 1/2021 | Jin | H04W 24/08 |
| 2021/0021355 | A1* | 1/2021 | Hwang | H04B 17/318 |
| 2021/0022015 | A1* | 1/2021 | Oh | H04L 5/0051 |
| 2021/0281448 | A1* | 9/2021 | Li | H04W 72/0413 |
| 2022/0124533 | A1* | 4/2022 | Li | H04L 5/0051 |

OTHER PUBLICATIONS

"3rd Generation Partnership Project; Technical Specification Group Radio Access Network; NR; Radio Resource Control (RRC) Protocol Specification (Release 15)", 3GPP Standard, Technical Specification; 3GPP TS 38.331, 3rd Generation Partnership Project (3GPP), Mobile Competence Centre, 650, Route Des Lucioles; F-06921 Sophia-Antipolis Cedex; France, vol. RAN WG2, No. V15.6.0, Jun. 29, 2019 (2019-06-29), pp. 1-519, XP051754472, [retrieved on 2019-06-29], paragraph 5.5.2, paragraph 5.6, paragraph 6.3.3, Sections 5.2.2.4.1 and 5.4.2.4.2 pp. 134-135, 162-163, 189-195, 241-244, 345-360, p. 47 ,p. 286, p. 389.

Huawei., et al., "UE-to-UE Measurement for Cross-Link Interference Mitigation", 3GPP Draft, 3GPP TSG RAN WG1 NR Ad Hoc Meeting, R1-1709982, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017 (Jun. 26, 2017), XP051299207, 9 Pages. Retrieved from the Internet: URL: http://www.3gpp.org/ftp/Meetings_3GPP_SYNC/RAN1/Docs/, [retrieved on Jun. 26, 2017] p. 2, lines 1-3.

International Search Report and Written Opinion—PCT/US2020/070459—ISAEPO—dated Nov. 26, 2020.

Qualcomm Incorporated: "CLI Measurements UE Capabilities", 3GPP Draft, 3GPP TSG-RAN2 Meeting #107-Bis, R2-1913392_CLI CAPABILITY-V2, 3rd Generation Partnership Project (3GPP), Mobile Competence Centre; 650, Route Des Lucioles; F-06921 Sophia-Antipolis Cedex; France, vol. RAN WG2, No. Chongqing, China; Oct. 14, 2019-Oct. 18, 2019, Oct. 4, 2019 (Oct. 4, 2019), XP051804971, 3 Pages, Retrieved from the Internet: URL: https://ftp.3gpp.org/tsg_ran/WG2_RL2/TSGR2_107bis/Docs/R2-1913392.zip R2-1913392 CLI capability-v2.docx, [retrieved on Oct. 4, 2019], paragraph 2, paragraph 3.

Qualcomm Incorporated: "Remaining Issues on CLI-RSSI and SRS-RSRP Measurement", 3GPP Draft, 3GPP TSG-RAN2 Meeting #107, R2-1909474, 3rd Generation Partnership Project (3GPP), Mobile Competence Centre; 650, Route Des Lucioles; F-06921 Sophia-Antipolis Cedex; France, vol. RAN WG2, No. Prague, Czech Republic, Aug. 26, 2019-Aug. 30, 2019, Aug. 16, 2019 (Aug. 16, 2019), XP051767273, 9 Pages, Retrieved from the Internet: URL: http://www.3gpp.org/ftp/tsg_ran/WG2_RL2/TSGR2_107/Docs/R2-1909474.zip, [retrieved on Aug. 16, 2019], paragraph 4, paragraph 2.1.

VIVO: "UE-to-UE CLI Measurements", 3GPP Draft, 3GPP TSG RAN WG1 #96, R1-1901690 UE-to-UE CLI Measurements, 3rd Generation Partnership Project (3GPP), Mobile Competence Centre, 650, Route Des Lucioles, Sophia-Antipolis Cedex, France, F-06921 vol. RAN WG1, No. Athens, Greece; Feb. 25, 2019-Mar. 1, 2019, Feb. 15, 2019 (Feb. 15, 2019), XP051599386, pp. 1-4, Retrieved from the Internet: URL: http://www.3gpp.org/ftp/tsg%5Fran/WG1%5FRL1/TSGR1%5F96/Docs/R1%2D1901690%2Ezip, [retrieved on Feb. 25, 2019], paragraph 1, paragraph 2.

* cited by examiner

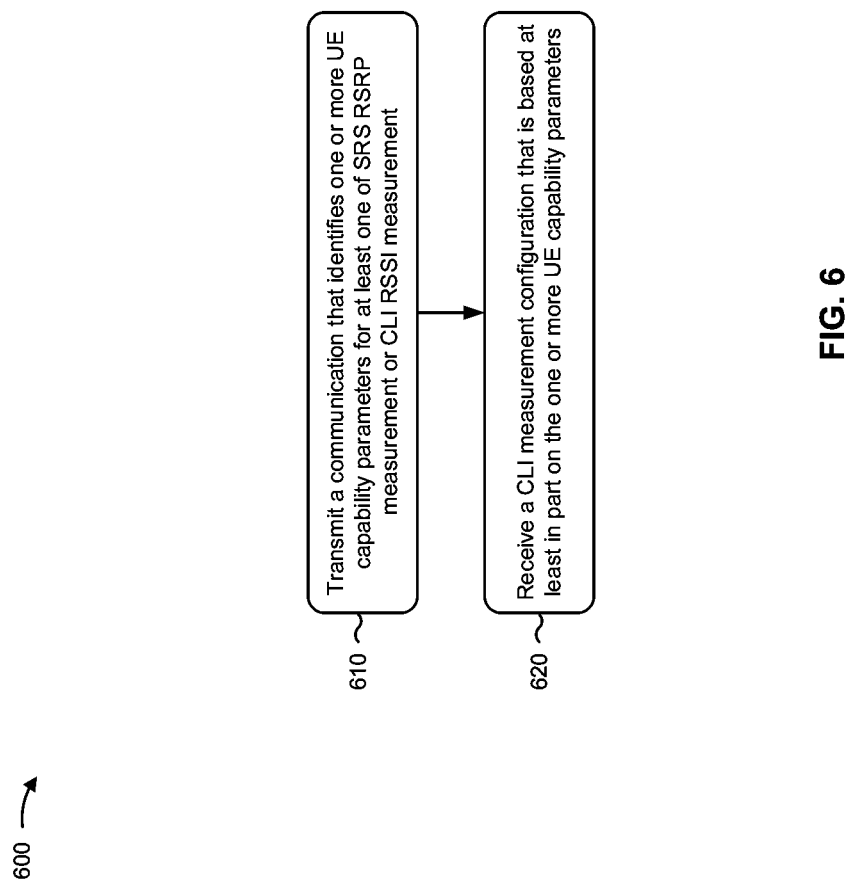

INDICATING A USER EQUIPMENT CAPABILITY FOR CROSSLINK INTERFERENCE MEASUREMENT

CROSS-REFERENCE TO RELATED APPLICATION

This patent application claims priority to U.S. Provisional Patent Application No. 62/891,726, filed on Aug. 26, 2019, entitled "INDICATING A USER EQUIPMENT CAPABILITY FOR CROSS-LINK INTERFERENCE MEASUREMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating a user equipment (UE) capability for cross-link interference (CLI) measurement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a communication that identifies one or more UE capability parameters for at least one of sounding reference signal (SRS) reference signal received power (RSRP) measurement or cross-link interference (CLI) received signal strength indication (RSSI) measurement; and receiving a CLI measurement configuration that is based at least in part on the one or more UE capability parameters.

In some aspects, a UE for wireless communication may include memory and one or more processors operatively coupled to the memory. The memory and the one or more processors may be configured to transmit a communication that identifies one or more UE capability parameters for at least one of SRS RSRP measurement or CLI RSSI measurement; and receive a CLI measurement configuration that is based at least in part on the one or more UE capability parameters.

In some aspects, a non-transitory computer-readable medium may store one or more instructions for wireless communication. The one or more instructions, when executed by one or more processors of a UE, may cause the one or more processors to: transmit a communication that identifies one or more UE capability parameters for at least one of SRS RSRP measurement or CLI RSSI measurement; and receive a CLI measurement configuration that is based at least in part on the one or more UE capability parameters.

In some aspects, an apparatus for wireless communication may include means for transmitting a communication that identifies one or more UE capability parameters for at least one of SRS RSRP measurement or CLI RSSI measurement; and means for receiving a CLI measurement configuration that is based at least in part on the one or more UE capability parameters.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
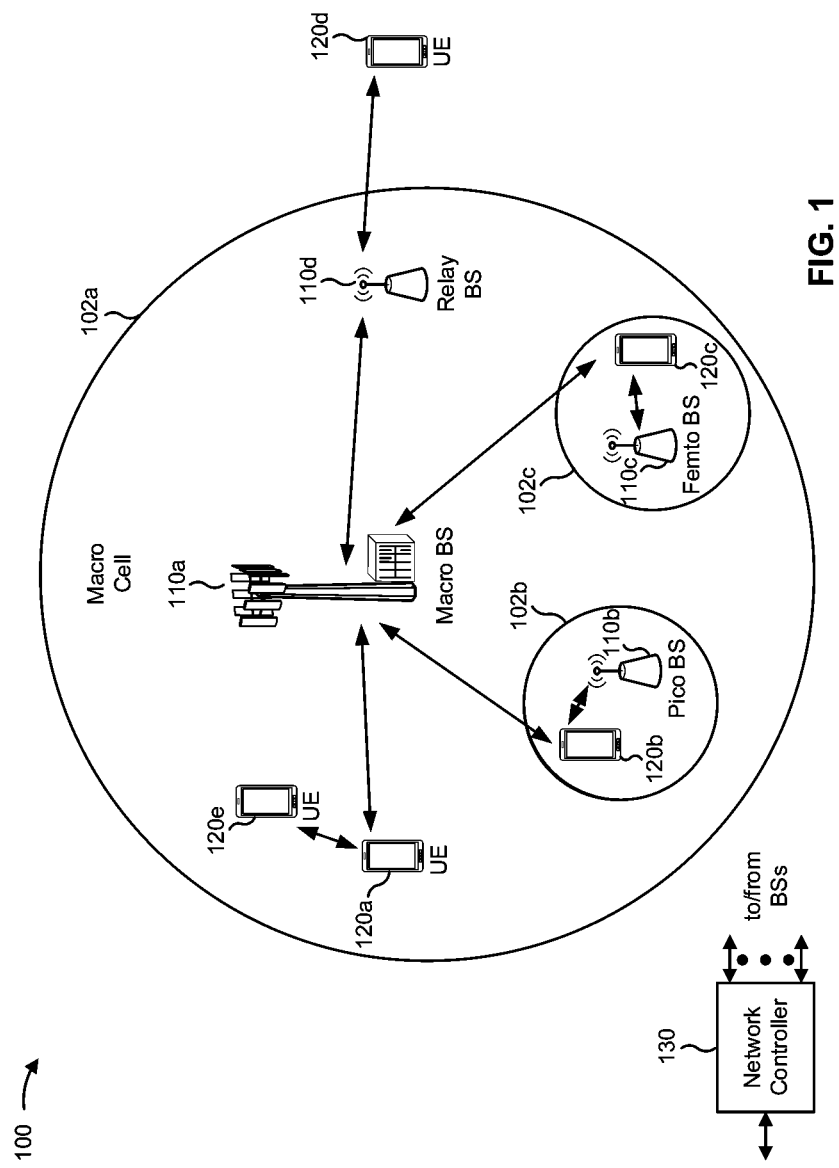
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
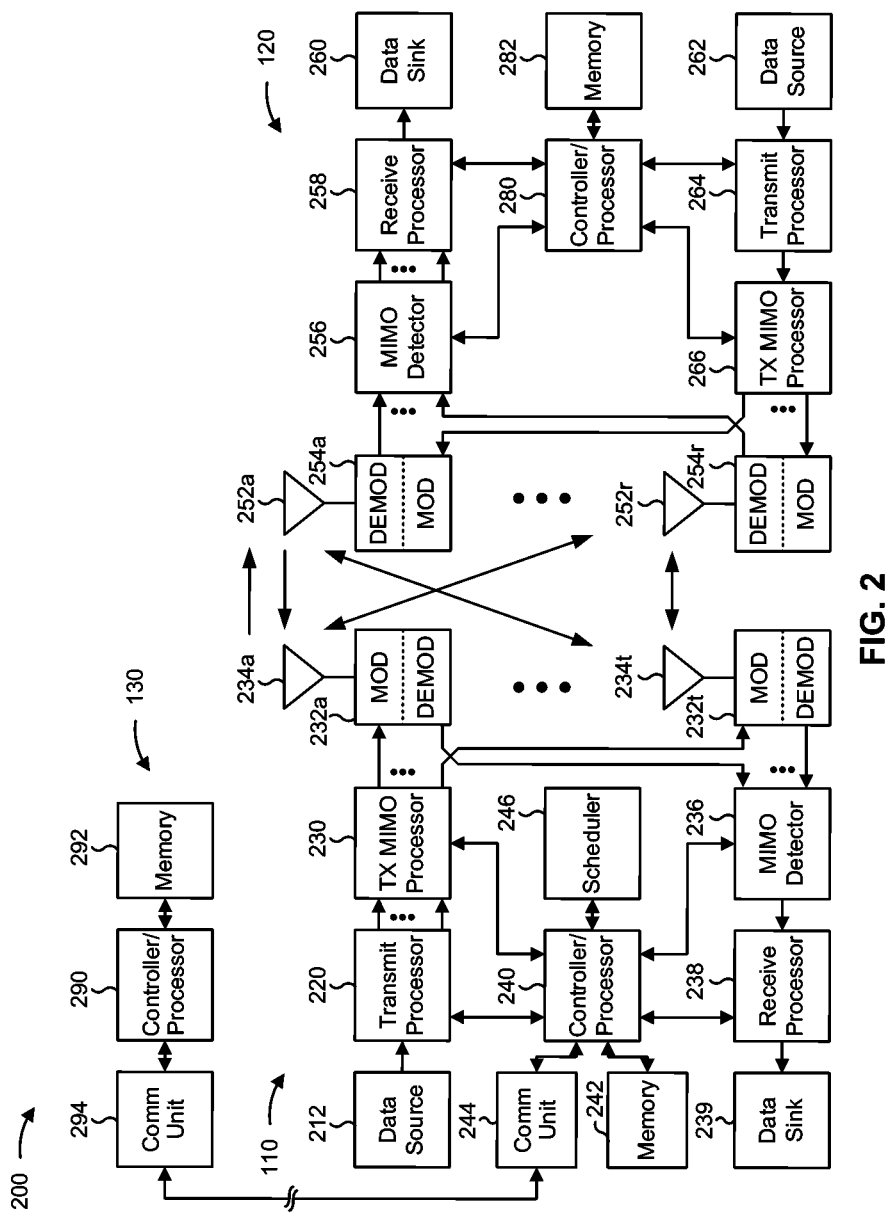
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating a UU capability for cross-link interference (CLI) measurement, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for transmitting a communication that identifies one or more UE capability parameters for at least one of sounding reference signal (SRS) RSRP measurement or CLI RSSI measurement, means for receiving a CLI measurement configuration that is based at least in part on the one or more UE capability parameters, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
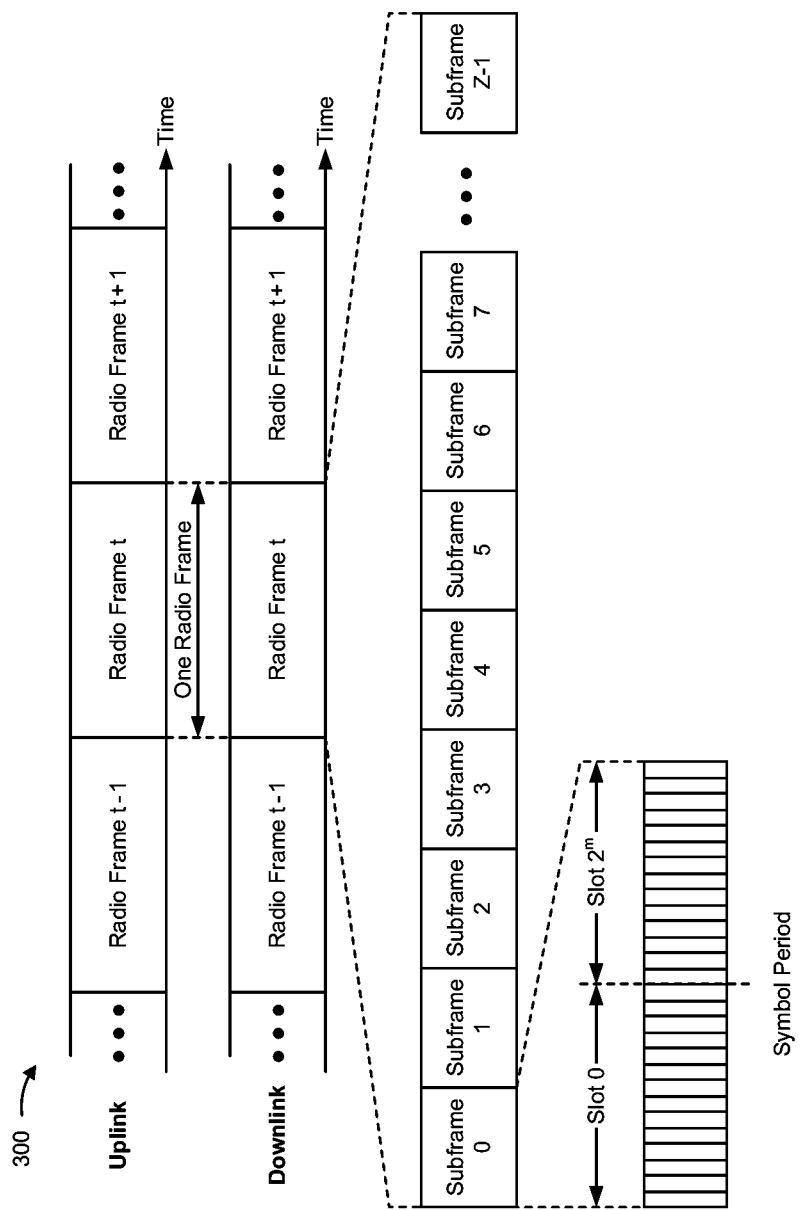
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
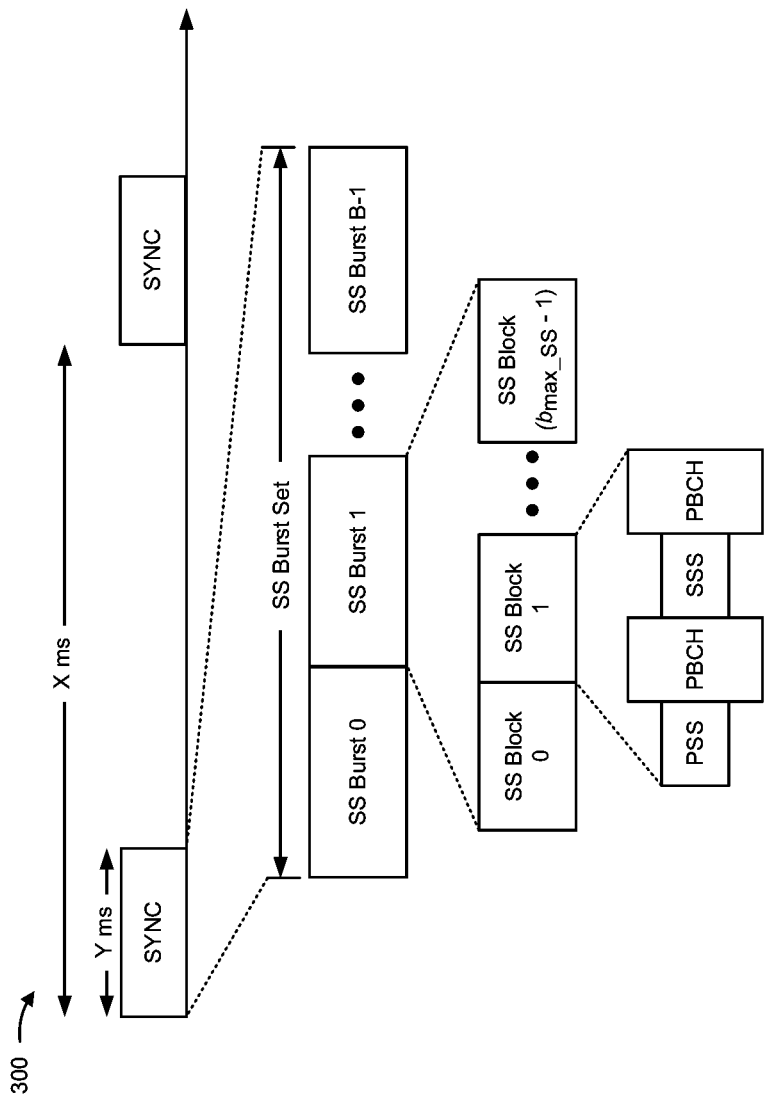
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
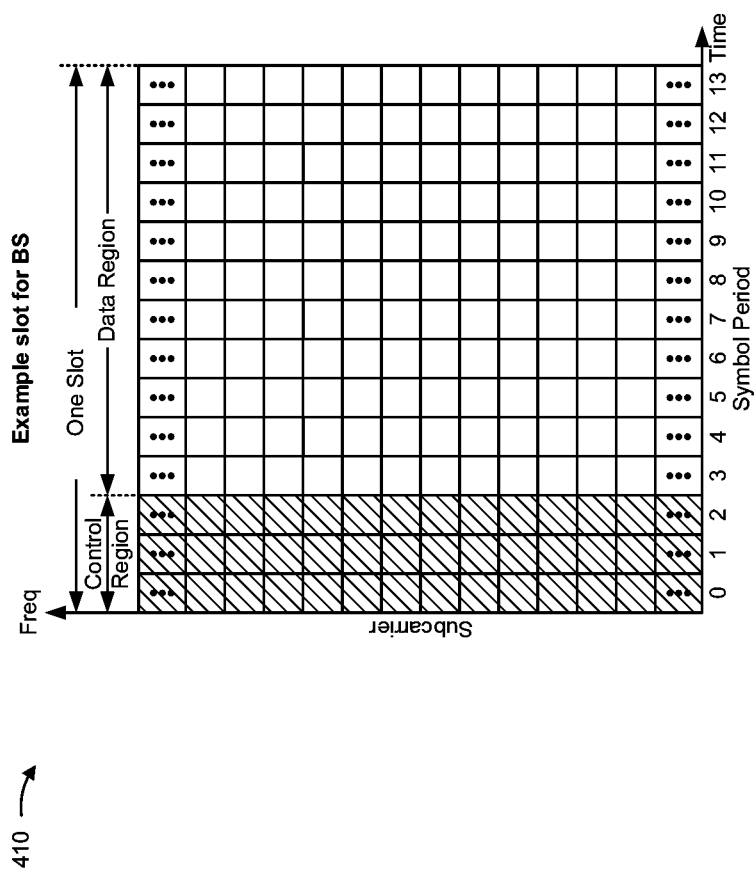
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a BS may provide wireless coverage in a cell in a time division multiplexing (TDM) configuration in which time-domain resources (e.g., symbols, slots, and/or the like) of the cell may be divided into uplink resources, downlink resources, and/or the like. In some cases, neighboring cells in the wireless network may be configured with different TDM configurations such that each of the neighboring cells is configured with a different combination of uplink resources and downlink resources.

In some cases, different TDM configurations in neighboring cells may cause CLI if the neighboring cells are configured to operate on the same (or an overlapping) frequency. Cross-link interference may refer to interference with downlink reception at a first UE in a first cell due to uplink transmission by a second UE in a second cell.

Cross-link interference may occur, for example, where a downlink resource of the first cell at least partially overlaps in the time-domain with an uplink resource of the second cell and where the first UE and the second UE are located at the cell edge of the respective cells.

In some cases, the first UE may be configured to measure the cross-link interference so that results of measurement of the cross-link interference may be used to adjust the transmit power of the second UE to reduce, mitigate, and/or eliminate CLI with downlink reception of the first UE. However, some UEs may be capable of supporting different CLI measurement configurations (e.g., due to different processing, memory, and/or networking capabilities). ABS may be unaware of a UE's capability for supporting CLI measurement, in which case the B S may configure the UE with a CLI measurement configuration that the UE may not support.

Some aspects described herein provide techniques and apparatuses for indicating a UE capability for CLI measurement. In some aspects, a UE may transmit a communication that identifies one or more UE capability parameters that the UE may support for CLI measurement. The UE capability parameters may indicate, for example, whether the UE supports CLI measurement of particular types of CLI measurement resources, whether the UE supports different sub-carrier spacing (SCS) for CLI measurement, the capability of the UE to perform a particular quantity of CLI measurements across serving cells of the UE, and/or other UE capability parameters for CLI measurement. In this way, a serving BS of the UE may receive the communication, may identify the UE capability parameters indicated in the communication, and may generate a CLI measurement configuration based at least in part on the UE capability parameters.

Figure 5:
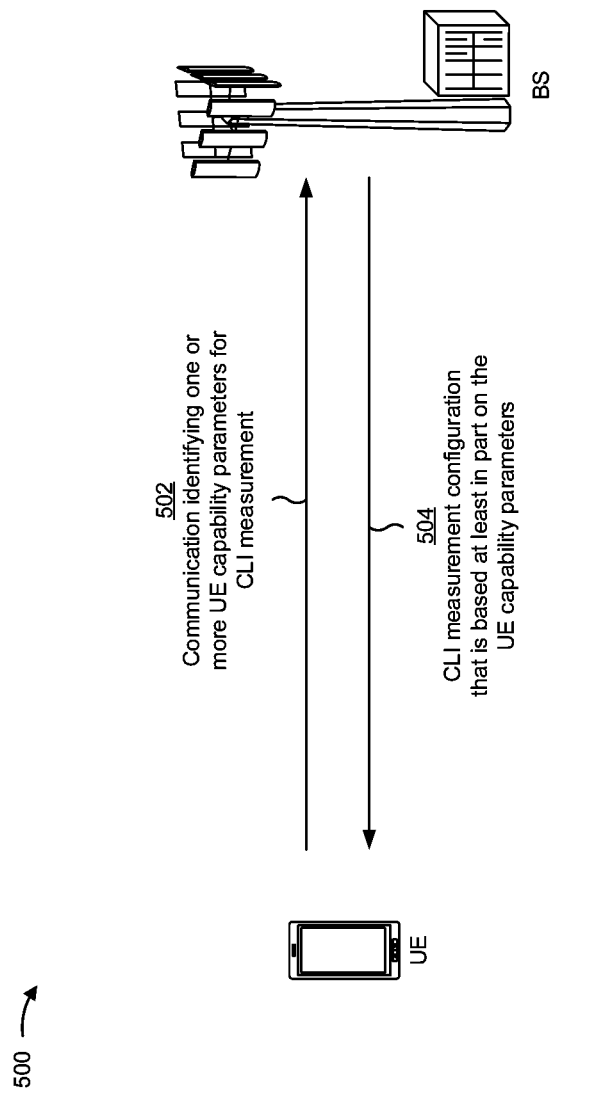
FIG. 5 is a diagram illustrating an example of indicating a UE capability for cross-link interference (CLI) measurement, in accordance with various aspects of the present disclosure.

FIG. 5 is a diagram illustrating one or more examples 500 of indicating a UE capability for CLI measurement, in accordance with various aspects of the present disclosure. As shown in FIG. 5, example(s) 500 may include communication between a BS (e.g., BS 110) and a UE (e.g., UE 120). In some aspects, the BS and the UE may be included in a wireless network (e.g., wireless network 100 and/or another wireless network). In some aspects, the BS may be a serving BS of the UE, and may generate and transmit a CLI measurement configuration to the UE such that the UE may perform CLI measurement in the wireless network.

As shown in FIG. 5, and by reference number 502, the UE may transmit, to the BS, a communication that identifies one or more UE capability parameters, associated with the UE, for CLI measurement. In some aspects, the communication may include an uplink control information (UCI) communication, a medium access control (MAC) control element (MAC-CE) communication, and/or another type of uplink communication. In some aspects, the UE may transmit the communication to the BS based at least in part on communicatively connecting with the BS, based at least in part on receiving a request from the BS for the UE capability parameters, and/or the like. In some aspects, the UE capability parameters may be included in the communication by one or more bits in one or more information elements and/or one or more other types of fields in the communication.

In some aspects, the UE capability parameters may be based at least in part on the processing capability of the UE, the memory capacity of the UE, the battery capacity of the UE (e.g., remaining battery life of the UE and/or the battery capacity of the UE), the capability of the UE to operate on particular frequency bands, a subscription of the UE (e.g., a subscription associated with the wireless network), and/or the like.

In some aspects, the UE capability parameters may include a capability to support various types of signal measurements for various types of CLI measurement resources. For example, the UE capability parameters may identify a capability to perform an RSRP measurement of a CLI measurement resource, such as a sounding reference signal (SRS) and/or another type of reference signal transmitted by another UE (e.g., cliMeas-SRS-RSRP). As another example, the UE capability parameters may identify a capability to perform an RSSI measurement of a CLI measurement resource, such as a particular time-domain and/or frequency-domain resource (e.g., an OFDM symbol and/or the like) (e.g., cliMeas-CLI-RSSI). In some aspects, the capability to perform an RSRP measurement of a CLI measurement resource and the capability to perform an RSSI measurement of a CLI measurement resource may be indicated by separate bits in the communication such that the UE may indicate whether the UE is capable of performing RSRP measurements, RSSI measurements, or both RSRP measurements and RSSI measurements.

In some aspects, the UE capability parameters may include a capability to perform gapless CLI measurements (e.g., cliMeas-SRS-RSRP-GapRequired, cliMeas-CLI-RSSI-GapRequired, and/or the like). The capability to perform gapless CLI measurements may indicate whether the UE is capable of performing a CLI measurement and receiving a downlink communication (e.g., a physical downlink control channel (PDCCH) communication, a physical downlink shared channel (PDSCH) communication, and/or the like) or transmitting an uplink communication (e.g., a physical uplink control channel (PUCCH), a physical uplink shared channel (PUSCH) communication, and/or the like) in back-to-back OFDM symbols. For example, a gapless CLI measurement may include receiving a downlink communication or transmitting an uplink communication in an OFDM symbol and performing a CLI measurement in the next consecutive OFDM symbol. In some aspects, the capability to perform gapless CLI measurements may be indicated by one or more bits in the communication.

In some aspects, the UE capability parameters may include a capability to perform an SRS RSRP measurement when a downlink channel (e.g., PDSCH, PDCCH, and/or the like) of the serving BS or cell is frequency division multiplexed with a CLI measurement resource (e.g., cliMeas-SRS-RSRP-FDMRequired), a capability to perform a CLI RSSI measurement when a downlink channel of the serving BS or cell is frequency division multiplexed with a CLI measurement resource (e.g., cliMeas-CLI-RSSI-FDMRequired, and/or the like), and/or the like. In some aspects, the capability to perform an SRS RSRP measurement when a downlink channel of the serving BS or cell is frequency division multiplexed with a CLI measurement resource, and the capability to perform a CLI RSSI measurement when a downlink channel of the serving BS or cell is frequency division multiplexed with a CLI measurement resource, may be indicated by the same bit (or bits) in the communication or by separate bits in the communication.

In some aspects, if the UE capability parameters indicate that the UE is capable of performing gapless CLI measurements, and the UE is not capable of performing an SRS RSRP measurement or a CLI RSSI measurement when a downlink channel of the serving BS or cell is frequency division multiplexed with a CLI measurement resource, the UE capability parameters may further indicate whether the UE is to receive the downlink channel or receive and perform the CLI measurement resource if the downlink channel of the serving BS or cell is frequency division multiplexed with the CLI measurement resource.

In some aspects, the UE capability parameters may indicate a capability to perform an SRS RSRP measurement when an SCS of a CLI measurement resource and an SCS of an active bandwidth part (BWP) associated with the UE are different SCSs (e.g., cliMeas-SRS-RSRP-DifferentSCS), may indicate a capability to perform a CLI RSSI measurement when the SCS of the CLI measurement resource and the SCS of the active BWP associated with the UE are different SCSs (e.g., cliMeas-CLI-RSSI-DifferentSCS), and/or the like. In some aspects, the capability to perform an SRS RSRP measurement when an SCS of a CLI measurement resource and an SCS of an active BWP associated with the UE are different SCSs, and the capability to perform a CLI RSSI measurement when the SCS of the CLI measurement resource and the SCS of the active BWP associated with the UE are different SCSs, may be indicated by the same bit (or bits) in the communication or by separate bits in the communication.

In some aspects, performing CLI measurement in a particular resource (e.g., time-domain resource and/or frequency-domain resource) may impact the UE's ability to perform beam management in the resource. In this case, the UE capability parameters may indicate a joint capability to perform beam management for CLI measurement reporting and other types of reporting or separate beam management capabilities for CLI measurement reporting and other types of reporting. For example, the UE capability may indicate a joint capability by indicating a capacity or quantity of resources (e.g., CLI measurement resources, channel state information (CSI) reference signals (CSI-RSs), synchronization signal blocks (SSBs), and/or the like) that the UE supports for CLI measurement reporting and other types of reporting in a same slot across all serving BSs or cells associated with the UE (e.g., maxNumberSSB-CSI-RS-ResourceOneTx). In some aspects, the other types of reporting may include CSI reporting (e.g., for reporting a CSI resource indicator (CRI) based at least in part on one or more CSI reference signals (CSI-RSs), synchronization signal block (SSB) reporting (e.g., for reporting an SSB resource indicator (SSBRI) based at least in part on one or more SSBs), and/or the like.

As another example, the UE may indicate separate capabilities by indicating a capacity or quantity of CLI measurement resources in a same slot that the UE supports for CLI measurement reporting (e.g., beamManagementSSB-CSI-RS-WithCLI-SRS) and indicating separate capacity or quantity of other resources that the UE supports in a same slot for other types of reporting across all serving BSs or cells associated with the UE (e.g., maxNumberSSB-CSI-RS-ResourceOneTx).

In some aspects, the UE capability parameters may indicate a capacity or capability to perform a quantity of SRS RSRP measurements in a same slot across all serving BSs or cells associated with the UE (e.g., cliMeas-SRS-RSRP-ResourcesOneTx) and/or a capacity or capability to perform a quantity of SRS RSRP measurements across all serving BSs or cells associated with the UE (e.g., cliMeas-SRS-RSRP-ResourcesTotal). In some aspects, the UE capability parameters may indicate a capacity or capability to perform a quantity of CLI RSSI measurements in a same slot across all serving BSs or cells associated with the UE (e.g., cliMeas-CLI-RSSI-ResourcesOneTx) and/or a capacity or capability to perform a quantity of CLI RSSI measurements across all serving BSs or cells associated with the UE (e.g., cliMeas-CLI-RSSI-ResourcesTotal).

In some aspects, the UE capability parameters may be the same or different for different frequency bands. For example, at least a subset of the UE capability parameters may be different for one or more sub-6 GHz frequency bands and one or more millimeter wave frequency bands.

As further shown in FIG. 5, and by reference number 504, the BS may transmit, to the UE, the CLI measurement configuration for the UE. As indicated above, the CLI measurement configuration may be based at least in part on the UE capability parameters for CLI measurement identified in the communication transmitted from the UE to the BS. The CLI measurement configuration may identify one or more time-domain and/or frequency-domain resources in which the UE is to perform one or more CLI measurements, the type(s) of CLI measurements that the UE is to perform, the type(s) of CLI measurement resources that the UE is to measure, and/or the like. In some aspects, the BS may transmit the CLI measurement configuration to the UE in a downlink control information (DCI) communication, a MAC-CE communication, a radio resource control (RRC) communication, and/or the like.

In this way, the UE may transmit a communication that identifies one or more UE capability parameters that the UE may support for CLI measurement. The UE capability parameters may indicate, for example, whether the UE supports CLI measurement of particular types of CLI measurement resources, whether the UE supports different SCS for CLI measurement, the capacity or capability of the UE to perform a particular quantity of CLI measurements across serving BSs or cells of the UE, and/or other UE capability parameters for CLI measurement. In this way, a serving BS of the UE may receive the communication, may identify the UE capability parameters indicated in the communication, and may generate a CLI measurement configuration based at least in part on the UE capability parameters.

As indicated above, FIG. 5 is provided as one or more examples. Other examples may differ from what is described with respect to FIG. 5.

FIG. 6 is a diagram illustrating an example process 600 performed, for example, by a UE, in accordance with various aspects of the present disclosure. Example process 600 is an example where the UE (e.g., UE 120) performs operations associated with indicating a UE capability for CLI measurement.

As shown in FIG. 6, in some aspects, process 600 may include transmitting a communication that identifies one or more UE capability parameters for at least one of SRS RSRP measurement or CLI RSSI measurement (block 610). For example, the UE (e.g., using receive processor 258, transmit processor 264, controller/processor 280, memory 282, and/or the like) may transmit a communication that identifies one or more UE capability parameters for at least one of SRS RSRP measurement or CLI RSSI measurement, as described above.

As further shown in FIG. 6, in some aspects, process 600 may include receiving a CLI measurement configuration that is based at least in part on the one or more UE capability parameters (block 620). For example, the UE (e.g., using receive processor 258, transmit processor 264, controller/processor 280, memory 282, and/or the like) may receive a CLI measurement configuration that is based at least in part on the one or more UE capability parameters, as described above.

Process 600 may include additional aspects, such as any single aspect or any combination of aspects described below and/or in connection with one or more other processes described elsewhere herein.

In a first aspect, the one or more UE capability parameters include at least one of a capability to perform an SRS RSRP measurement or a capability to perform a CLI RSSI measurement. In a second aspect, alone or in combination with the first aspect, the capability to perform the SRS RSRP measurement is indicated in the communication by a first bit, and the capability to perform the CLI RSSI is indicated in the communication by a second bit.

In a third aspect, alone or in combination with one or more of the first and second aspects, the one or more UE capability parameters include a capability to perform gapless CLI measurements. In a fourth aspect, alone or in combination with one or more of the first through third aspects, the one or more UE capability parameters include at least one of a capability to perform an SRS RSRP measurement when a downlink channel of a serving cell is frequency division multiplexed with a CLI measurement resource or a capability to perform a CLI RSSI measurement when the downlink channel of the serving cell is frequency division multiplexed with the CLI measurement resource.

In a fifth aspect, alone or in combination with one or more of the first through fourth aspects, the capability to perform the SRS RSRP measurement when the downlink channel of the serving cell is frequency division multiplexed with the CLI measurement resource is indicated in the communication by a first bit, and the capability to perform the CLI RSSI measurement when the downlink channel of the serving cell is frequency division multiplexed with the CLI measurement resource is indicated in the communication by a second bit. In a sixth aspect, alone or in combination with one or more of the first through fifth aspects, the capability to perform the SRS RSRP measurement when the downlink channel of the serving cell is frequency division multiplexed with the CLI measurement resource, and the capability to perform the CLI RSSI measurement when the downlink channel of the serving cell is frequency division multiplexed with the CLI measurement resource, are indicated in the communication by a same bit.

In a seventh aspect, alone or in combination with one or more of the first through sixth aspects, the one or more UE capability parameters indicate that the UE is capable of performing gapless CLI measurements, and whether the UE is to receive a downlink channel of a serving cell or a CLI measurement resource if the downlink channel of the serving cell is frequency division multiplexed with the CLI measurement resource. In an eighth aspect, alone or in combination with one or more of the first through seventh aspects, the one or more UE capability parameters include at least one of a capability to perform an SRS RSRP measurement when an SCS of a CLI measurement resource and an SCS of an active BWP associated with the UE are different SCSs, or a capability to perform a CLI RSSI measurement when the SCS of the CLI measurement resource and the SCS of the active BWP associated with the UE are different SCSs.

In a ninth aspect, alone or in combination with one or more of the first through eighth aspects, the capability to perform the SRS RSRP measurement when the SCS of the CLI measurement resource and the SCS of the active BWP associated with the UE are different SCSs is indicated in the communication by a first bit, and the capability to perform the CLI RSSI measurement when the SCS of the CLI measurement resource and the SCS of the active BWP associated with the UE are different SCSs is indicated in the communication by a second bit. In a tenth aspect, alone or in combination with one or more of the first through ninth aspects, the one or more UE capability parameters include a quantity of resources that are supported for CLI measurement reporting, CSI-RS measurement reporting, and synchronization signal block measurement reporting in a same slot across all serving cells associated with the UE.

In an eleventh aspect, alone or in combination with one or more of the first through tenth aspects, the one or more UE capability parameters include a quantity of resources that are supported for CLI measurement resources in a same slot across all serving cells associated with the UE. In a twelfth aspect, alone or in combination with one or more of the first through eleventh aspects, the one or more UE capability parameters include a capacity capability to perform a quantity of sounding reference signal reference signal received power measurements in a same slot across all serving cells associated with the UE.

In a thirteenth aspect, alone or in combination with one or more of the first through twelfth aspects, the one or more UE capability parameters include a capacity capability to perform a quantity of sounding reference signal reference signal received power measurements across all serving cells associated with the UE. In a fourteenth aspect, alone or in combination with one or more of the first through thirteenth aspects, the one or more UE capability parameters include a capacity capability to perform a quantity of CLI received signal strength indication measurements in a same slot across all serving cells associated with the UE.

In a fifteenth aspect, alone or in combination with one or more of the first through fourteenth aspects, the one or more UE capability parameters include a capacity capability to perform a quantity of CLI received signal strength indication measurements across all serving cells associated with the UE. In a sixteenth aspect, alone or in combination with one or more of the first through fifteenth aspects, the one or more UE capability parameters are associated with one or more sub-6 GHz frequency bands; one or more other UE capability parameters are associated with one or more millimeter wave frequency bands, and at least a subset of the one or more UE capability parameters, and at least a subset of the one or more other UE capability parameters are, different UE capability parameters.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting a communication that identifies a plurality of UE capabilities including a first UE capability, to perform a sounding reference signal (SRS) reference signal received power (RSRP) measurement when a downlink channel of a serving cell is frequency division multiplexed with a cross-link interference (CLI) measurement resource, and a second UE capability to perform a CLI received signal strength indication (RSSI) measurement when the downlink channel of the serving cell is frequency division multiplexed with the CLI measurement resource; and
   receiving a CLI measurement configuration that is based at least in part on the plurality of UE capabilities.

2. The method of claim 1, wherein the first UE capability is indicated in the communication by a first bit of the communication; and
   wherein the second UE capability is indicated in the communication by a second bit of the communication.

3. The method of claim 1, wherein the plurality of UE capabilities includes a third UE capability to perform gapless CLI measurements.

4. The method of claim 1, wherein the plurality of UE capabilities includes a third UE capability indicating a quantity of resources that are supported for CLI measurement reporting, channel state information reference signal (CSI-RS) measurement reporting, and synchronization signal block measurement reporting in a same slot across all serving cells associated with the UE.

5. The method of claim 1, wherein the plurality of UE capabilities includes a third UE capability indicating a quantity of resources that are supported for CLI measurement resources in a same slot across all serving cells associated with the UE.

6. The method of claim 1, wherein the plurality of UE capabilities includes a capacity capability to perform a quantity of SRS RSRP measurements across all serving cells associated with the UE.

7. The method of claim 6, wherein the capacity capability is to perform a quantity of SRS RSRP measurements in a same slot across all serving cells associated with the UE.

8. The method of claim 1, wherein the plurality of UE capabilities includes a capacity capability to perform a quantity of CLI RSSI measurements across all serving cells associated with the UE.

9. The method of claim 8, wherein the capacity capability is to perform a quantity of CLI RSSI measurements in a same slot across all serving cells associated with the UE.

10. The method of claim 1, wherein one of the first UE capability or the second UE capability is associated with one or more sub-6 GHz frequency bands; and
    wherein a different one of the first UE capability or the second UE capability is associated with one or more millimeter wave frequency bands.

11. A user equipment (UE) for wireless communication, comprising:
    a memory; and
    one or more processors coupled to the memory, wherein the memory includes instructions executable by the one or more processors to cause the UE to:
       transmit a communication that identifies a plurality of UE capabilities including a first UE capability, to perform a sounding reference signal (SRS) reference signal received power (RSRP) measurement when a downlink channel of a serving cell is frequency division multiplexed with a cross-link interference (CLI) measurement resource, and a second UE capability to perform a CLI received signal strength indication (RSSI) measurement when the downlink channel of the serving cell is frequency division multiplexed with the CLI measurement resource; and
       receive a CLI measurement configuration that is based at least in part on the plurality of UE capabilities.

12. The UE of claim 11, wherein the plurality of UE capabilities includes a capacity capability to perform a quantity of SRS RSRP measurements across all serving cells associated with the UE.

13. The UE of claim 12, wherein the capacity capability is to perform the quantity of SRS RSRP measurements in a same slot across all serving cells associated with the UE.

14. The UE of claim 11, wherein the plurality of UE capabilities includes a capacity capability to perform a quantity of CLI RSSI measurements across all serving cells associated with the UE.

15. A non-transitory computer-readable medium storing one or more instructions for wireless communication, the one or more instructions comprising:
    one or more instructions that, when executed by one or more processors of a user equipment (UE), cause the one or more processors to:
       transmit a communication that identifies a plurality of UE capabilities including a first UE capability, to perform a sounding reference signal (SRS) reference signal received power (RSRP) measurement when a downlink channel of a serving cell is frequency division multiplexed with a CLI measurement resource, and a second UE capability to perform a CLI received signal strength indication (RSSI) measurement when the downlink channel of the serving cell is frequency division multiplexed with the CLI measurement resource; and receive a CLI measurement configuration that is based at least in part on the plurality of UE capabilities.

16. The non-transitory computer-readable medium of claim 15, wherein the plurality of UE capabilities includes a capacity capability to perform a quantity of SRS RSRP measurements in a same slot across all serving cells associated with the UE.

17. An apparatus for wireless communication, comprising:
means for transmitting a communication that identifies a plurality of user equipment (UE) capabilities including a first UE capability, to perform a sounding reference signal (SRS) reference signal received power (RSRP) measurement when a downlink channel of a serving cell is frequency division multiplexed with a cross-link interference (CLI) measurement resource, and a second UE capability to perform a CLI received signal strength indication (RSSI) measurement when the downlink channel of the serving cell is frequency division multiplexed with the CLI measurement resource; and
means for receiving a CLI measurement configuration that is based at least in part on the plurality of UE capabilities.

18. The apparatus of claim 17, wherein the plurality of UE capabilities includes a capacity capability to perform a quantity of SRS RSRP measurements across in a same slot across all serving cells associated with the apparatus.

19. The method of claim 1, wherein the communication identifies the first UE capability via a first capability parameter associated with performing the SRS RSRP measurement and the second UE capability via a second capability parameter associated with performing the CLI RSSI measurement.

20. The UE of claim 11, wherein one of the first UE capability or the second UE capability is associated with one or more sub-6 GHz frequency bands; and
wherein a different one of the first UE capability or the second UE capability is associated with one or more millimeter wave frequency bands.

21. The UE of claim 11, wherein the communication identifies the first UE capability via a first capability parameter associated with performing the SRS RSRP measurement and the second UE capability via a second capability parameter associated with performing the CLI RSSI measurement.

22. The apparatus of claim 17, wherein one of the first UE capability or the second UE capability is associated with one or more sub-6 GHz frequency bands; and
wherein a different one of the first UE capability or the second UE capability is associated with one or more millimeter wave frequency bands.

23. The non-transitory computer-readable medium of claim 15, wherein the communication identifies the first UE capability via a first capability parameter associated with performing the SRS RSRP measurement and the second UE capability via a second capability parameter associated with performing the CLI RSSI measurement.

24. The non-transitory computer-readable medium of claim 15, wherein one of the first UE capability or the second UE capability is associated with one or more sub-6 GHz frequency bands; and
wherein a different one of the first UE capability or the second UE capability is associated with one or more millimeter wave frequency bands.

25. The apparatus of claim 18, wherein the communication identifies the first UE capability via a first capability parameter associated with performing the SRS RSRP measurement and the second UE capability via a second capability parameter associated with performing the CLI RSSI measurement.

26. The method of claim 1, wherein the CLI measurement configuration is received via a radio resource control (RRC) communication.

27. The user equipment of claim 11, wherein the CLI measurement configuration is received via a radio resource control (RR) communication.

28. The method of claim 1, wherein the downlink channel comprises at least one of a physical downlink shared channel or a physical downlink control channel.

29. The UE of claim 11, wherein the downlink channel comprises at least one of a physical downlink shared channel or a physical downlink control channel.

30. The non-transitory computer-readable medium of claim 15, wherein the downlink channel comprises at least one of a physical downlink shared channel or a physical downlink control channel.

* * * * *